United States Patent Office 3,377,276
Patented Apr. 9, 1968

3,377,276
DRILLING FLUIDS AND ADDITIVES THEREFOR
Harry W. Parker, Bartlesville, Okla., assignor to Phillips Petroleum Company, a corporation of Delaware
No Drawing. Filed Nov. 7, 1963, Ser. No. 322,026
14 Claims. (Cl. 252—8.5)

This invention relates to drilling fluids and additives therefor. In one aspect this invention relates to improved drilling fluids containing an added agent which imparts improved lubricating properties and improved fluid loss properties to said drilling fluid. In another aspect this invention relates to methods of using said improved drilling fluids in wells.

In the art of drilling wells to tap subterranean deposits of fluids such as oil and/or gas, especially when drilling by the rotary method employing a rotary bit and drill stem, a drilling fluid, usually a compounded fluid made to predetermined physical and chemical properties, is circulated to the bottom of the bore hole, out through openings in the bit at the bottom of the bore hole, and then back up said bore hole to the surface by passage through the annular space between said drill stem and the wall of said bore hole (or between said drill stem and the wall of the casing where casing has been put in place).

The drilling fluid must act as a liquid medium of controlled viscosity for removing cuttings from the bore hole; it must prevent excessive amounts of fluid from flowing from the bore hole into surrounding formations by depositing on the wall of the hole a thin but substantially impervious filter cake; it must possess a gel structure of sufficient strength to hold in suspension solids, particularly during any time the fluid is not circulating; it must serve as as a weighting material exerting sufficient pressure to counterbalance any pressure exerted by water, gas, oil, or other fluid from a penetrated structure and to prevent caving or other intrusion into the drill hole. Said drilling fluid must also serve as a lubricant for the bearings of the drill bit and the cutting surface of the bit teeth, and to reduce frictional forces on the drill pipe.

These requirements have been met in the past by employing both aqueous or water base and non-aqueous or oil base drilling fluids. The aqueous drilling fluids normally comprise water, finely divided inorganic materials such as various types of clays and clayey materials, and weighting materials suspended in the water. The non-aqueous or oil base drilling fluids normally comprise a non-aqueous liquid such as crude oil or a petroleum distillate, and a weighting material which can be a clay or other suitable material. In addition to aqueous and non-aqueous drilling fluids as defined above, emulsion-type drilling fluids are often used. These emulsion drilling fluids normally comprise a substantially water-insoluble liquid such as oil, a finely divided inorganic material such as clay, and water, together with a suitable dispersing or emulsifying agent. The two types of emulsion drilling fluids are the oil-in-water emulsion type, sometimes referred to as water base emulsion type, and the water-in-oil emulsion type, sometimes referred to as oil base emulsion type. In the latter, oil forms the continuous phase of the emulsion, and in the former, water or brine forms the continuous phase of the emulsion.

An important property which a drilling fluid should possess is that of lubrication. In recent years increased emphasis has been placed upon this property. A large portion of the drilling time consumed during the drilling of a well is taken up in replacing drill bits. The amount of time consumed during drilling operations in replacing drill bits increases roughly in proportion to the depth drilled because, in order to replace a bit the entire drill string must be removed, the bit replaced, and the entire drill string then rerun. Furthermore, each time circulation of the drilling fluid is stopped and the drill string pulled, the likelihood of a cave-in is increased. Past experience has shown that the most important factor in shortening the life of a drill bit is failure of the bit bearings. Such bearing failures frequently occur long before the cutting teeth are worn to such an extent as to require replacement of the bit. Thus, conventional prior art drilling fluids are obviously lacking in adequate lubrication properties insofar as the bearings of the bit are concerned.

It is also important to reduce the frictional forces on the drill pipe. There exists considerable torque on said drill pipe due to the friction between the outside of the drill pipe and the wall of the well, whether said wall is represented by casing, open hole, cement, or other materials. A drilling fluid possessing enhanced lubrication properties will minimize said frictional forces.

I have now discovered that aqueous drilling fluids, e.g., water base drilling fluids and oil-in-water emulsion drilling fluids, can be made to possess enhanced lubricating properties and improved fluid loss properties by incorporating castor pomace therein.

Thus, broadly speaking, the present invention resides in: (1) improved aqueous drilling fluids having incorporated therein a small but effective amount of castor pomace sufficient to improve at least one of (a) the lubricating properties and (b) the fluid loss properties of said drilling fluid, said amount being insufficient to increase the viscosity of the drilling fluid to the extent that it cannot readily be pumped or circulated; (2) methods of using said drilling fluids; and (3) a new alkali-treated castor pomace additive for drilling fluids.

An object of this invention is to provide an improved well drilling fluid. Another object of this invention is to provide an improved drilling fluid having enhanced lubricating properties. Another object of this invention is to provide an improved drilling fluid having improved fluid loss properties. Another object of this invention is to provide an additive for use in aqueous drilling fluids, e.g., water base drilling fluids and oil-in-water emulsion drilling fluids, which will impart enhanced lubricating properties to said drilling fluid so that said drilling fluid will more effectively lubricate the bearings of a rotary bit under extreme pressure conditions which are encountered during drilling operations employing said bit. Another object of this invention is to provide methods of using said improved drilling fluids in the drilling or workover of wells. Another object of this invention is to provide a method of drilling and/or completing a well in which method a drilling fluid of the invention is circulated in said well. Other aspects, objects, and advantages of the invention will be apparent to those skilled in the art in view of this disclosure.

Thus, according to the invention, there is provided an aqueous drilling fluid, comprising water and a small but effective amount of castor pomace sufficient to improve at least one of the (a) lubricating properties and (b) fluid loss properties of said drilling fluid.

Further according to the invention, there is provided an alkali-treated castor pomace, suitable for use as an additive in an aqueous drilling fluid to improve at least one of the (a) lubricating properties and (b) fluid loss properties of said drilling fluid, prepared by: treating a castor pomace selected from the group consisting of raw castor pomace and extracted castor pomace, and mixtures thereof with an alkali metal hydroxide.

Still further according to the invention, there are provided methods of using the improved well drilling fluids of the invention, which methods comprise circulating said well drilling fluids into and from the bore hole in contact with the walls of said bore hole.

Raw castor pomace is the solid residue remaining after castor oil has been pressed from the seeds or beans of the castor bean plant—*Ricinus communis* of the family Eurphorbiaceae. Said raw castor pomace usually contains from about 18 to about 28, more usually from about 20 to about 25, weight percent residual natural oil. Said raw castor pomace may also contain the seed husks depending upon whether or not said husks have been removed prior to pressing of the castor beans. As available commercially, the raw castor pomace is a particulate material having a particle size ranging from finely divided powder up to about 4 mesh or slightly larger. For use in the practice of the invention said raw castor pomace is ground or otherwise comminuted to a particle size within the range of from about 8 to about 100 mesh, U.S. Standard Series. However, the actual particle size is not critical so long as the major portion of the castor pomace is a reasonably fine powder. As shown hereinafter, said raw castor pomace is very effective in improving the lubricating properties and the fluid loss properties of aqueous drilling fluids.

In commercial operations for the production of castor oil, the above-described raw castor pomace is usually extracted with a suitable inert organic solvent to remove additional quantities of oil. The extracted castor pomace which is available commercially usually contains from about 1 to about 3 weight percent residual oil and thus can be considered to be substantially oil free. The amount of residual oil remaining in the extracted castor pomace will depend upon the efficiency and type of extraction method employed. The raw castor pomace is usually ground or comminuted prior to extraction. Any suitable extraction method, either batch or continuous, can be employed in preparing the extracted castor pomace used in the practice of the invention. For example, I have found that extracted castor pomace prepared by repeated batch extractions and containing a small amount of residual oil to be very effective in improving the lubricating properties and also the fluid loss properties of aqueous drilling fluids. I have also found that extracted castor pomace prepared by efficient continuous extraction methods, such as in a Soxhlet extractor, and extracted until no more oil remains, to be very effective in improving the lubricating properties and also the fluid loss properties of aqueous drilling fluids. In the practice of the invention any suitable inert organic solvent which does react chemically with either the oil being extracted or the castor pomace residue, and which has a boiling point lower than said oil, can be used for extracting the raw castor pomace. Examples of suitable solvents include the lower boiling alcohols, hydrocarbons such as hexane, heptane, etc. Thus any extracted castor pomace, ranging from completely oil-free extracted castor pomace to those having only a relatively small reduction in the amount of oil, can be used in the practice of the invention.

Thus, herein and in the claims, unless otherwise specified, the term "extracted castor pomace" refers to and includes raw castor pomace which has been extracted with a suitable inert organic solvent and which has (1) a reduced residual oil content, (2) is substantially oil-free, or (3) is oil-free. The extracted castor pomace which is substantially oil-free is presently preferred for use in the practice of the invention when it is desired to use an extracted castor pomace.

I have also found that raw castor pomace treated with an alkali, e.g., an alkali metal hydroxide, is very effective in improving the lubricating properties and the fluid loss properties of aqueous drilling fluids. The alkali-treated castor pomace used in the practice of the invention can be prepared by any suitable method. According to one method, 100 pounds of ground raw castor pomace is treated (with stirring) with from about 2 to about 16 pounds of an alkali metal hydroxide, e.g., sodium hydroxide, for from about 1 to about 10, preferably about 3 to about 6 hours, at a temperature within the range of about 150 to about 200, preferably about 160 to about 180° F., at atmospheric pressure. At the end of the treating period the treated mixture is dried to remove the water, and then powdered. According to another method, an extracted castor pomace which has been prepared as described above is used as the starting material to prepare an alkali-treated castor pomace which tests have shown to be an effective additive for use in aqueous drilling fluids in accordance with the invention. As used herein and in the claims, unless otherwise specified, the term "alkali metal hydroxide" includes the hydroxides of sodium, potassium, lithium, cesium, and rubidium.

From the above, and as shown further hereinafter, it is seen there are at least three types of castor pomace which can be used in the practice of the invention. Thus, herein and in the claims, unless otherwise specified, the term "castor pomace" is employed generically and includes all three of the above-discussed types, raw castor pomace, extracted castor pomace, alkali-treated castor pomace, and mixtures thereof.

The castor pomace used in the practice of the invention can be incorporated in the aqueous drilling fluids in any suitable manner. Castor pomace is largely insoluble in water. However, this presents no problem because said castor pomace is readily dispersible in water, aqueous solutions, or aqueous emulsions such as oil-in-water emulsions. Thus, the powdered castor pomace can be added to the aqueous drilling fluids as a dispersion in water, a dispersion in an aqueous solution of another additive, or a dispersion in an aqueous emulsion. If desired, the powdered castor pomace can be added directly as such to the jet hopper commonly employed in formulating drilling fluids. The incorporation of the castor pomace with the drilling fluid can either be before or during the drilling of the well. Thus, said castor pomace can be incorporated in the drilling fluids of the invention in any suitable manner and at any suitable time.

The amount of the castor pomace used in drilling fluids in accordance with the invention will vary from well to well depending upon conditions encountered in the drilling or other operations on the well, the characteristics of the particular drilling fluid being used, the formation being drilled, and other factors which can be readily determined by those skilled in the art upon being acquainted with this disclosure. It has long been customary in rotary well drilling operations to subject the drilling fluid to simple routine tests from time to time, and these tests are sufficient to indicate the relative amounts of castor pomace, water, oil, or other ingredients to be employed in the drilling fluids of the invention.

The amount of castor pomace used in the drilling fluids of the invention will also depend, to some extent, upon whether the operator is primarily interested in improving the lubricating properties or the fluid loss properties of the drilling fluid being used. Thus, one can add an amount of castor pomace which is sufficient to obtain a desired improvement in lubricating properties and can then use another water loss control agent in combination with said castor pomace. However, as shown by the examples given hereinafter, castor pomace is very effective in improving both the lubricating properties and the fluid loss properties of aqueous drilling fluids. It is unusual to find this combination of advantages in one additive and said combination of advantages represents one of the outstanding features of this invention.

While therefore the amount of castor pomace used in the drilling fluid of the invention is not of the essence of the invention, it can be stated that the amount of castor pomace used will normally be within the range of about 0.5 to 24, preferably 1 to 12, pounds per barrel of drilling fluid when one is primarily interested in improving the lubricating properties of the drilling fluid. When the primary concern is to improve the fluid loss properties of the drilling fluid, the amount of castor pomace used will normally be within the range of from 3 to 24, preferably 6 to 12, pounds per barrel of drilling fluid. However, it is within the scope of the invention to employ amounts of castor pomace which are outside said ranges. As good herein and in the claims, unless otherwise specified, the word "barrel" refers to a barrel of 42 standard U.S. gallons.

The fatty acid constituents (or derivatives thereof) of the castor oil which remain in the pressed castor bean usually impart acid characteristics (pH less than 7, generally about 5 to 6) to aqueous dispersions of castor pomace. It is usually not desirable to use a drilling fluid which has a pH value of less than 7. Thus, it is desirable, but not always essential, to add sufficient of an alkali metal hydroxide to the drilling fluids of the invention to increase the pH of said drilling fluids to at least 7, preferably from about 8.0 to 12, as desired. Said alkali metal hydroxide can be incorporated in the drilling fluid in specific amounts during the formulation thereof, or can be added in amounts sufficient to give a desired pH value in the completed drilling fluid. I have found that the presence of the alkali metal hydroxide in the drilling fluids of the invention apparently aids in dispersing the castor pomace in the water, and thus improves the effectiveness of the additive, particularly when the primary concern is improving the fluid loss characteristics or properties of the drilling fluid. In some instances, depending upon the amount of alkali metal hydroxide used in preparing the alkali-treated castor pomace, it is not necessary to add alkali metal hydroxide to the drilling fluid to bring the pH to a value above 7.

The castor pomace utilized in the practice of the invention can be used in a wide variety of aqueous drilling fluids, e.g., water base drilling fluids and oil-in-water emulsion drilling fluids. In some wells, particularly where hard limestone formations containing no shale or clay are being drilled, the drilling fluid can be water containing only a very small amount of finely divided inorganic solids such as clay solids. Many times the drilling of a well is started with only water as the drilling fluid. As the drilling progresses and shales or clay formations are penetrated, the circulating water will pick up natural clays and become what is commonly referred to as a drilling mud or drilling fluid. In such instances the natural clays can constitute as much as 40 percent by weight of the drilling fluid. More frequently, however, it is desirable to prepare a drilling fluid which is to be used in the drilling by mixing a clayey material such as a natural clay or bentonite with water. If a drilling fluid is thus prepared, the concentration of the clayey material is usually much lower, generally constituting from about 1 to about 15 weight percent of the entire composition. Thus, the drilling fluids of the invention in which the castor pomace is utilized can contain only relatively small amounts of said clayey materials or can contain said clayey materials in amounts up to about 40 weight percent of the entire composition.

The finely divided inorganic solids used in the drilling fluids increase the viscosity and afford plastering properties to said fluids by aiding the formation of a filter cake on the wall of the bore hole and thus aids in reducing fluid loss to the formations penetrated by said bore hole. While the presence of said solids is desirable initially, it should be pointed out that the drilling fluids of the invention are operable without the initial addition of said solids because a certain solids content will develop during the drilling. The finely divided inorganic solids used in the practice of the invention should be insoluble in the oil phase as well as insoluble in the water phase so that they will remain undissolved over long periods of time. Examples of finely divided solids suitable for use in the practice of the invention include, among others, the following: bentonite, ground limestone, barites, ground oyster shells, diatomaceous earth, fuller's earth, kaolin, attapulgite, McCracken clay, and other native and/or treated clays. Mixtures of two or more of said finely divided solids can also be used. Some of said materials such as barites and limestone are used primarily as weighting agents. All of said materials are preferably ground until at least about 90 percent will pass through a 325-mesh screen.

A preferred drilling fluid for many drilling operations is an oil-in-water emulsion drilling fluid. These drilling fluids can also contain clay or clayey materials in concentrations ranging from small amounts up to about 40 weight percent. Said oil-in-water emulsion drilling fluids are usually distinguished from water base drilling fluids by their content of from 1 to 40, preferably 3 to 25, weight percent of oil. However, there is really no sharp dividing line between water base drilling fluids and oil-in-water emulsion drilling fluids because water forms the continous phase in both. Both are frequently referred to as aqueous drilling fluids. Thus, herein and in the claims, unless otherwise specified, the term "aqueous drilling fluid" is used generically and refers to both water base drilling fluids and oil-in-water emulsion drilling fluids.

In an oil-in-water emulsion drilling fluid, the principal value of the oil is as an aid in controlling the density of the drilling fluid and its fluid loss properties. Oils which can be used in the practice of the invention are usually petroleum oils, although other oleaginous materials such as vegetable and animal oils can be used, though seldom with economic advantage. The oils in any event should contain at least some material boiling above the gasoline boiling range, i.e., above about 400° F. at atmospheric pressure. Oils with too high a content of highly volatile hydrocarbons in the gasoline boiling range are undesirable because of the danger of fire, and because of the low viscosity. It is preferred that the oil have a flash point about 140° F. Examples of suitable oils which can be employed in the practice of the invention include, among others, the following: crude oil, topped crude oil, gas oils, kerosene, diesel fuels, heavy alkylates, fractions of heavy alkylates, heavy fuel oil, various other petroleum fractions, and the like. The more preferred oils are predominantly paraffinic in character since these are less detrimental to rubber components in pumps, lines, etc. It is preferred that the oil have a gravity within the range of 15–40° API.

The aqueous drilling fluids of the invention, both the water base drilling fluids and the oil-in-water emulsion drilling fluids, can contain other additives such as emulsifiers, stabilizers, and thinning agents when required to adjust the properties of the drilling fluids in accordance with conventional practice. Thus, it will be understood that other additives can be added to the drilling fluids of this invention without departing from the scope of the invention. Special materials are oftentimes added to drilling fluids for particular purposes, and such additional materials can be employed in the drilling fluids of this invention, providing a usual and conventional test indicates a lack of obvious adverse reactions, and such additional additives are applicable in the drilling fluids of this invention with few, if any, exceptions.

The other properties, and the tests therefor, which are essential to drilling fluids, such as viscosity, surface tension, gel strength, and absence of foaming, are not significantly affected by the presence of castor pomace in the aqueous drilling fluids of the invention.

In the examples given hereinafter, the lubricating properties of the drilling fluids of the invention were determined by employing a modified Shell Four-Ball Extreme Pressure Lubricant Tester. Said Shell Four-Ball Tester is well known to those skilled in the art and one model thereof is available commercially from the Precision Scientific Company, 3737 West Cortland Street, Chicago 47, Ill.

Essentially, the Four-Ball E.P.L. Tester consists of four metal balls arranged in the form of an equilateral tetrahedron. The basic elements are three lower balls held immovably in a clamp to form a cradle in which a fourth or upper ball is caused to rotate about a vertical axis under prescribed conditions of load and speed. The contacting surfaces on the four-ball type apparatus are geometrically well-defined, thus providing obvious advantages in the study of wear and friction phenomena.

The points of contact are lubricated by the lubricant under test, which is held in a cup surrounding the four-ball assembly. There is a lever and thrust bearing arrangement for varying the force with which the three balls are pushed upward against the rotating ball. Also, there is a torque measuring device attached to the cup assembly and friction is measured by determining the torque on the lower ball holder.

Further details concerning said Shell Four-Ball Tester can be found in the manual furnished with the machine or available from said Precision Scientific Company, Technical Service Department, as Form No. 261.

For use in determining the lubricating properties of the drilling fluids of the invention said Shell Four-Ball Tester was modified by substituting three Pyrex balls for the three steel balls mounted in the lower position. A steel ball was retained for the fourth or upper ball. The coefficient of friction, $\mu$, is determined from torque as follows. Torque is registered on a chart which is wrapped around a drum traveling at one r.p.m. In making a measurement, a base line is drawn with the chart drive operating, but with the spindle motor not operating. Then, the sample cup assembly containing the three lower positioned Pyrex balls is given a thrust load of 6 kilograms, and a run of one minute is made with the spindle and chart drive both operating. The machine is temporarily shut off, and the thrust is raised to 12 kg. for another one-minute run. Likewise, runs are made at 18, 24, 30, and 36 kg., unless the torque indicator becomes "pegged," in which case the runs are terminated. The balls are not changed during the runs on a given sample. Each one-minute run serves as a run-in period for the next higher load.

The distance (in mm.) between the base line and the curve (at a given loading) is measured at 5-second intervals and averaged. Then, $\mu = 0.3365\ U/P$, where
U = displacement of pen in mm., and
P = thrust loading in kg.

Numerous tests on a wide variety of drilling fluids have shown that coefficients of friction determined on the above-described modified Shell Four-Ball Tester are reliable in evaluating the lubricating properties of drilling fluids.

The fluid or water loss values reported in the examples given hereinafter were determined in accordance with standard API Code 29 procedures.

Except where specified otherwise therein, the drilling fluids described in the examples given hereinafter were prepared by the mixing procedure set forth in Example I.

The following examples will serve to further illustrate the invention.

EXAMPLE I

A series of four sample water base drilling fluids containing 12.5 weight percent McCracken clay and having 1, 3, 6, and 12 pounds of raw castor pomace per barrel of fluid, respectively, dispersed therein was prepared for tests. Said raw castor pomace was a commercially available castor pomace containing 23 weight percent of residual natural oil. Sodium hydroxide was added to each of said four sample drilling muds in the amounts shown in Table I below. Said sample drilling fluids were prepared by mixing the ingredients shown in Table I plus water in a high speed mixer for 30 minutes and then allowing the drilling fluid to stand for three hours before testing. Each drilling fluid was tested for pH in conventional manner and was then tested for lubricating properties using a modified Shell Four-Ball Tester as described above. The results of said tests are set forth under Runs 1–4 inclusive in Table I below.

Another series of three sample drilling fluids containing 3, 6, and 12 pounds of said raw castor pomace per barrel, respectively, was prepared as described above. Sufficient sodium hydroxide was added to each of said drilling fluids to give the pH value shown for Runs 5, 6, and 7 in Table I below. Each of said three drilling fluids was then tested for lubricating properties using the above-mentioned Shell Four-Ball Tester. The results of said tests are set forth in Table I below.

Two control drilling fluids, C–1 and C–2, were also prepared and tested for lubricating properties. Control sample C–1 contained no caustic and control sample C–2 contained sufficient caustic to give a pH of 10.5. The results of tests on said control samples are also set forth in Table I below.

A comparison of the results of said tests in Runs 1–7 inclusive with the results of tests in the control Runs C–1 and C–2 shows that said raw castor pomace is an effective additive for enhancing or improving the lubricating properties of the drilling fluids at all the concentrations tested, and particularly at concentrations of three pounds per barrel or greater.

EXAMPLE II

In another run a base mud containing 20 weight percent kaolin and 4 weight percent bentonite in water was prepared in conventional manner. A sample of said base mud was used to prepare a drilling fluid containing 12 pounds per barrel of the raw castor pomace additive used in Example I. Said drilling fluid was tested for lubricating properties using the Shell Four-Ball Tester as in Example I. A control sample of said base mud, identified as C–3, was also tested for lubricating properties. The results of said tests are set forth in Table I below. A comparison of said results shows that the raw castor pomace is an effective additive for improving the lubricating properties of said kaolin-bentonite mud also.

TABLE I

| Example No. | Run No. | Drilling Fluid Composition | | | | Drilling Fluid Properties | | | | | | |
|---|---|---|---|---|---|---|---|---|---|---|---|---|
| | | Clay, wt. Percent | NaOH, lbs./bbl. | Additive | | pH | Coefficient of Friction $\mu$ at kg. Values Given Below | | | | | |
| | | | | Type | lbs./bbl. | | 6 | 12 | 18 | 24 | 30 | 36 |
| I | 1 | [1] 12.5 | 0.025 | Raw [3] | 1 | 8.1 | 0.050 | 0.064 | 0.042 | 0.032 | 0.025 | 0.021 |
| I | 2 | 12.5 | 0.05 | Raw | 3 | 8.8 | [4] 0 | 0 | 0.031 | 0.031 | 0.040 | 0.034 |
| I | 3 | 12.5 | 0.05 | Raw | 6 | 8.3 | 0 | 0.025 | 0.024 | 0.018 | 0.014 | 0.039 |
| I | 4 | 12.5 | 0.05 | Raw | 12 | 7.8 | 0 | 0 | 0 | 0 | 0 | 0.014 |
| I | 5 | 12.5 | | Raw | 3 | 10.7 | 0.008 | 0.004 | 0.041 | 0.063 | 0.063 | 0.056 |
| I | 6 | 12.5 | | Raw | 6 | 11.1 | 0 | 0 | 0 | 0.025 | 0.030 | 0.036 |
| I | 7 | 12.5 | | Raw | 12 | 10.9 | 0 | 0 | 0 | 0.025 | 0.043 | 0.047 |
| | C–1 | 12.5 | | | 0 | 7.3 | 0.703 | 0.620 | 0.500 | 0.336 | 0.404 | |
| | C–2 | 12.5 | | | 0 | 10.5 | 0.453 | 0.521 | 0.550 | 0.531 | 0.440 | 0.359 |
| II | 1 | 24.0 | | Raw | 12 | 10.6 | 0 | 0.108 | 0.110 | 0.092 | | |
| | C–3 | [2] 24.0 | | | 0 | 10.4 | 0.392 | 0.547 | 0.380 | 0.315 | | |

[1] 12.5 wt. percent McCracken clay.
[2] 20.0 wt. percent Kaolin and 4.0 wt. percent Bentonite.
[3] Raw castor pomace containing 23 wt. percent residual natural oil.
[4] A zero value (0) means the coefficient of friction was too small to measure.

EXAMPLE III

A sample of the raw castor pomace used in the test runs of Examples I and II was extracted with normal hexane by placing approximately 1000 ml. of said castor pomace in a beaker and covering same with normal hexane. The resulting mixture was allowed to stand overnight (approximately 15 to 20 hours). The hexane containing the extracted oil was then decanted and a fresh batch of normal hexane mixed with the castor pomace. This second mixture was also allowed to stand overnight as described. This extraction procedure was repeated for a total of four extractions. After the fourth extraction the supernatant hexane was decanted and the extracted castor pomace was dried in a vacuum oven at 158° F. for a period of time sufficient to remove any remaining hexane.

The thus prepared extracted castor pomace was used in preparing four additional sample water base drilling fluids containing 12.5 weight percent McCracken clay as in Example I above. Said four sample drilling fluids are identified as Runs 1–4 inclusive in Table II below and contained 1, 3, 6, and 12 pounds per barrel, respectively, of said extracted castor pomace. Sodium hydroxide was added to said sample drilling fluids in the amounts shown in Table II below.

A fifth sample drilling fluid (Run 5) containing 12 pounds per barrel of said extracted castor pomace was also prepared. Sufficient sodium hydroxide was added to said fifth drilling fluid to give a pH of 10.9. All five sample drilling fluids were tested for lubricating properties using the Shell Four-Ball Tester as described in Example I. The results of said tests are set forth in Table II below. The results of tests on control samples C–1 and C–2 are also included in Table II for convenience.

A comparison of the results on said five sample drilling fluids with the results obtained on the control drilling fluids C–1 and C–2 shows that said extracted castor pomace is also a very effective additive for improving the lubricating properties of drilling fluids at all concentrations tested, and particularly at concentrations of 3 pounds per barrel or greater.

EXAMPLE IV

An alkali-treated castor pomace was prepared in the following manner. A 281-gram portion of the raw castor pomace used in Example I was mixed with 44 grams of sodium hydroxide in 1 liter of water. The resulting mixture was stirred for approximately 4 hours at 170° F. and then dried in a vacuum oven at 158° F. until the water had been removed. The resulting dried product was then powdered.

The thus prepared alkali-treated castor pomace was used in preparing three additional water base drilling fluids containing 12.5 weight percent of McCracken clay as in Example I above. Said three drilling fluids had the composition (plus water) shown in Table II below. In Runs 1 and 2 sodium hydroxide was added in the amount shown. In Run 3 sufficient sodium hydroxide was added to give a pH of 10.4. Said three drilling fluids were then tested for lubricating properties using the Shell Four-Ball Tester as described in Example I above. A comparison of the results of said tests shows that said alkali-treated castor pomace is also a very effective additive for improving the lubricating properties for drilling fluids.

TABLE II

| Example No. | Run No. | Drilling Fluid Composition | | | | Drilling Fluid Properties | | | | | | |
|---|---|---|---|---|---|---|---|---|---|---|---|---|
| | | Clay,[1] wt. Percent | NaOH, lbs./bbl. | Additive | | pH | Coefficient of Friction μ at kg. Values Given Below | | | | | |
| | | | | Type | lbs./bbl. | | 6 | 12 | 18 | 24 | 30 | 36 |
| III | 1 | 12.5 | 0.025 | Ext.[2] | 1 | 7.3 | 0.056 | 0.064 | 0.046 | 0.067 | 0.204 | -------- |
| III | 2 | 12.5 | 0.025 | Ext. | 3 | 7.5 | 0.067 | 0.033 | 0.022 | 0.050 | 0.058 | 0.066 |
| III | 3 | 12.5 | 0.025 | Ext. | 6 | 7.4 | 0.083 | 0.061 | 0.041 | 0.030 | 0.040 | 0.040 |
| III | 4 | 12.5 | 0.050 | Ext. | 12 | 9.6 | 0.061 | 0.030 | 0.020 | 0.017 | 0.038 | 0.044 |
| III | 5 | 12.5 | -------- | Ext. | 12 | 10.9 | [4]0 | 0 | 0 | 0.012 | 0.035 | 0.061 |
| | C–1 | 12.5 | -------- | -------- | 0 | 7.3 | -------- | 0.620 | 0.500 | 0.336 | 0.404 | -------- |
| | C–2 | 12.5 | -------- | -------- | 0 | 10.5 | -------- | 0.521 | 0.550 | 0.531 | 0.440 | 0.359 |
| IV | 1 | 12.5 | 0.125 | C.T.[3] | 1 | 10.0 | -------- | 0.080 | 0.022 | 0.016 | 0.013 | 0.038 |
| IV | 2 | 12.5 | 0.125 | C.T. | 3 | 10.0 | -------- | 0.039 | 0.026 | 0.019 | 0.015 | 0.013 |
| IV | 3 | 12.5 | -------- | C.T. | 12 | 10.4 | 0 | 0 | 0 | 0 | 0 | 0 |

[1] McCracken clay.
[2] Extracted castor pomace.
[3] Alkali-treated castor pomace.
[4] A zero value (0) means the coefficient of friction was too small to measure.

EXAMPLE V

Another series of runs was made to test the effectiveness of said raw castor pomace as a water loss control agent in drilling fluids in the absence of clay and other finely divided solids. Four sample drilling fluids were prepared by dispersing said raw castor pomace in water in amounts of 1, 3, 6, and 12 pounds per barrel of water. The castor pomace used was the raw castor pomace containing 23 weight percent residual oil used in Example I above. Each of said drilling fluids contained 0.15 pound of sodium hydroxide per barrel of fluid. Each drilling fluid was tested for pH, and also for water loss properties. Said drilling fluids were also tested after aging overnight at 80° C. The results of said tests are set forth in Table III below. Said results show the effectiveness of the raw castor pomace as a fluid loss control agent with increasing concentrations of the castor pomace in the drilling fluid.

EXAMPLE VI

Another series of runs, similar to the runs of Example V, was made to test the effect of varying amounts of sodium hydroxide in the drilling fluid. Three sample drilling fluids were prepared by dispersing 12 pounds of said raw castor pomace (23 weight percent residual oil as in Example I) per barrel in water containing varying amounts of sodium hydroxide. Said sample drilling fluids were tested for pH and water loss properties before and after aging, as in Example V above. The results of said tests are set forth in Table III below.

EXAMPLE VII

Another series of runs, similar to the runs of Example V, was made to test the effectiveness of said raw castor pomace (described in Example I) as a water loss control agent in drilling fluids contaminated with gypsum. Three drilling fluids were prepared by dispersing 12 pounds of said raw castor pomace per barrel in water containing varying amounts of gypsum as shown in Table III below. Said sample drilling fluids were tested for pH and water loss properties before and after aging as in Example V above. The results of said tests are set forth in Table III below and show that said raw castor pomace is an effective water loss control agent even in the presence of such contaminants as gypsum.

EXAMPLE VIII

Another series of runs, similar to those of Example V above, was made to test the effectiveness of said raw castor pomace (described in Example I) as a water loss control agent in drilling fluids contaminated with salt. Three sample drilling fluids were prepared by dispersing 12 pounds of said raw castor pomace per barrel in water containing varying amounts of sodium hydroxide and which had been saturated with sodium chloride. Said sample drilling fluids were tested for pH and water loss properties before and after aging as in Example V above. The results of said tests are set forth in Table III below and show that said raw castor pomace is an effective water loss control agent, even in the presence of contaminants such as sodium chloride.

tiveness of castor pomace as a fluid loss control agent in oil-in-water emulsion drilling fluids. Runs 1 and 2 of this series are, in effect, control runs showing the effectiveness of 12 pounds per barrel of said raw castor pomace (described in Example I) in drilling fluids respectively (1) containing no clayey material and (2) containing 12.5 weight percent McCracken clay. Runs 3 and 4 of this series were made with comparable drilling fluids which had been converted to oil-in-water emulsion drilling fluids containing 4.1 volume percent of diesel fuel. The results of pH and fluid loss tests on said four sample drilling fluids are set forth in Table IV below. A comparison of the results of the tests in Runs 1 and 3, and a comparison of the results of the tests in Runs 2 and 4, shows that said

TABLE III

| Example No. | Run No. | Drilling Fluid Composition | | | | | | Drilling Fluid Properties | | | |
|---|---|---|---|---|---|---|---|---|---|---|---|
| | | Clay, wt. Percent | NaOH, Lbs./bbl. | Gypsum, Lbs./bbl. | NaCl, Lbs./bbl. | Additive | | Initial | | After Aging Overnight at 80° C. | |
| | | | | | | Type | Lbs./bbl. | pH | Water Loss, cc./30 min. | pH | Water Loss, cc./30 min. |
| V | 1 | 0 | 0.15 | 0 | 0 | Raw [1] | 1 | 11.7 | 69.0 | 11.7 | 54.0 |
| V | 2 | 0 | 0.15 | 0 | 0 | Raw | 3 | 11.6 | 33.0 | 11.5 | 31.5 |
| V | 3 | 0 | 0.15 | 0 | 0 | Raw | 6 | 11.4 | 26.0 | 11.2 | 21.0 |
| V | 4 | 0 | 0.15 | 0 | 0 | Raw | 12 | 11.0 | 20.0 | 10.8 | 17.2 |
| VI | 1 | 0 | 0.5 | 0 | 0 | Raw | 12 | 11.5 | 18.0 | 9.5 | 15.0 |
| VI | 2 | 0 | 1.0 | 0 | 0 | Raw | 12 | 11.9 | 17.6 | 10.4 | 14.8 |
| VI | 3 | 0 | 2.0 | 0 | 0 | Raw | 12 | 11.9 | 15.0 | 11.5 | 16.4 |
| VII | 1 | 0 | 1.0 | 1 | 0 | Raw | 12 | 11.6 | 11.4 | 10.3 | 53.0 |
| VII | 2 | 0 | 2.0 | 1 | 0 | Raw | 12 | 12.0 | 11.8 | 11.6 | 17.8 |
| VII | 3 | 0 | 2.0 | 3 | 0 | Raw | 12 | 11.4 | 11.4 | 11.7 | 21.8 |
| VIII | 1 | 0 | 0.5 | 0 | Sat.[2] | Raw | 12 | 10.5 | 11.0 | 9.5 | 88.0 |
| VIII | 2 | 0 | 1.0 | 0 | Sat. | Raw | 12 | 11.3 | 10.8 | 10.6 | 55.0 |
| VIII | 3 | 0 | 2.0 | 0 | Sat. | Raw | 12 | 11.5 | 21.2 | 11.3 | 20.0 |

[1] Raw castor pomace containing 23 wt. percent residual natural oil.
[2] Water used in drilling fluid was saturated with respect to NaCl.

EXAMPLE IX

Three additional runs were made wherein 12 pounds of said raw castor pomace (described in Example I) per barrel and varying amounts of sodium hydroxide were added to and dispersed in water containing 6.25 weight percent McCracken clay. The results of pH and water loss tests on the three sample drilling fluids before and after aging are set forth in Table IV below. The results of tests on two control samples (Runs C-4 and C-5) are also set forth in Table IV below. A comparison of the results of the tests on said three sample drilling fluids with the results of the tests on said control drilling fluids shows that said raw castor pomace is an effective water loss control agent in the presence of clayey materials.

EXAMPLE X

Another series of four runs was made to test the effecraw castor pomace is also an effective fluid loss control agent in oil-in-water emulsion drilling fluids.

TABLE IV

| Example No. | Run No. | Drilling Fluid Composition | | | | | Drilling Fluid Properties | | | |
|---|---|---|---|---|---|---|---|---|---|---|
| | | Clay,[1] wt. percent | NaOH, lbs./bbl. | Diesel Fuel, vol. percent | Additive | | Initial | | After Aging Overnight at 80° C. | |
| | | | | | Type | Lbs./bbl. | pH | Water Loss, cc./30 min. | pH | Water Loss, cc./30 min. |
| IX | 1 | 6.25 | 0.125 | 0 | Raw [2] | 12 | 10.1 | 19.2 | 8.9 | |
| IX | 2 | 6.25 | 0.25 | 0 | Raw | 12 | 11.1 | 10.6 | 9.6 | 11.2 |
| IX | 3 | 6.25 | 0.50 | 0 | Raw | 12 | 11.7 | 14.6 | 9.7 | 9.6 |
| | C-4 | 6.25 | 0.125 | 0 | | 0 | 10.4 | 42.6 | 11.4 | 40.0 |
| | C-5 | 6.25 | 0.25 | 0 | | 0 | 11.3 | 43.0 | 10.6 | 42.0 |
| X | 1 | 0 | 1.0 | 0 | Raw | 12 | 11.5 | 19.6 | | |
| X | 2 | 12.5 | 2.0 | 0 | Raw | 12 | 11.3 | 17.6 | | |
| X | 3 | 0 | 1.0 | 4.1 | Raw | 12 | 11.5 | 11.0 | | |
| X | 4 | 12.5 | 2.0 | 4.1 | Raw | 12 | 11.3 | 13.0 | | |

[1] McCracken clay.  [2] Raw castor pomace containing 23 wt. percent residual natural oil.

EXAMPLE XI

An oil-free extracted castor pomace was prepared by continuously extracting a sample of said raw castor pomace containing 23 weight percent residual oil (as described in Example I) with normal hexane in a Soxhlet extractor until no more oil remained in the castor pomace.

The thus prepared extracted castor pomace was used to prepare a series of three water base drilling fluids containing 12 pounds of said extracted castor pomace per barrel of water, 12.5 weight percent McCracken clay, and varying amounts of sodium hydroxide. Said three drilling fluids were tested for pH and water loss properties before and after aging. The results of said tests are set forth in Table V below and show that said extracted castor pomace is an effective water loss control agent.

EXAMPLE XII

The extracted castor pomace prepared in Example XI above was used to prepare another series of three water base drilling fluids like those prepared in said Example XI except that the water used was saturated with sodium chloride. Said three drilling fluids were tested for pH and water loss properties before and after aging. The results of said tests are set forth in Table V below.

The results of tests on control drilling fluids C-6, C-7, and C-8 are also set forth in said Table V. Said control drilling fluids were prepared in the same manner as the drilling fluids of Runs 1, 2, and 3 of each of the above Examples XI and XII except that they contained no extracted castor pomace additive and no salt contaminant. A comparison of the results obtained in testing the drilling fluids of Runs 1, 2, and 3 of each of Examples XI and XII with the results obtained in testing said control drilling fluids shows that said extracted castor pomace is an effective water loss control agent, even in the presence of contaminants such as sodium chloride.

treated castor pomace as a water loss control agent. In this series, Runs 1, 2, 5, and 6 were water base drilling fluids containing 12 pounds of said alkali-treated castor pomace per barrel of water, and in some instances other ingredients as shown in Table VII below. Runs 3 and 4 of this series were oil-in-water emulsion drilling fluids containing 4.1 volume percent of diesel fuel and 12 pounds of said alkali-treated castor pomace per barrel of fluid. Said six drilling fluids were tested for pH and fluid loss properties and the results of said tests are set forth in Table VII below to show that said alkali-treated castor pomace is also an effective water loss control agent.

EXAMPLE XV

Another alkali-treated castor pomace was prepared in the following manner. Four hundred grams of the raw castor pomace (described in Example I above) was mixed with 20 grams of sodium hydroxide in 2 liters of water. The resulting mixture was stirred for approximately 6 hours at 150 to 190° F. and then dried in a

TABLE V

| Example No. | Run No. | Drilling Fluid Composition | | | | | Drilling Fluid Properties | | | |
|---|---|---|---|---|---|---|---|---|---|---|
| | | Clay,[1] wt. percent | NaOH, lbs./bbl. | NaCl, lbs./bbl. | Additive | | Initial | | After Aging Overnight at 80° C. | |
| | | | | | Type | Lbs./bbl. | pH | Water Loss, cc./30 min. | pH | Water Loss, cc./30 min. |
| XI | 1 | 12.5 | 0.5 | 0 | Ext.[2] | 12 | 10.8 | 12.4 | 9.4 | 10.0 |
| XI | 2 | 12.5 | 1.0 | 0 | Ext. | 12 | 11.6 | 10.2 | 10.2 | 7.6 |
| XI | 3 | 12.5 | 2.0 | 0 | Ext. | 12 | 12.1 | 13.2 | 11.5 | 9.8 |
| XII | 1 | 12.5 | 0.5 | Sat.[3] | Ext. | 12 | 10.3 | 23.2 | 9.6 | |
| XII | 2 | 12.5 | 1.0 | Sat. | Ext. | 12 | 11.0 | 17.4 | 10.3 | 16.6 |
| XII | 3 | 12.5 | 2.0 | Sat. | Ext. | 12 | 11.0 | 15.6 | 10.2 | 26.0 |
| | C-6 | 12.5 | 0.5 | 0 | | 0 | 11.2 | 18.8 | 10.2 | 20.0 |
| | C-7 | 12.5 | 10 | 0 | | 0 | 11.9 | 34.4 | 11.4 | 29.0 |
| | C-8 | 12.5 | 2.0 | 0 | | 0 | 12.2 | 43.0 | 12.0 | 43.0 |

[1] McCracken clay.  [2] Extracted castor pomace.  [3] Water in drilling fluid saturated with respect to NaCl.

EXAMPLE XIII

The extracted castor pomace prepared by the batch extraction method of Example III above was used to prepare another series of eight water base drilling fluids to test the effectiveness of said batch extracted castor pomace in drilling fluids containing no clayey material. The drilling fluids prepared for this series of runs each contained 12 pounds of said batch extracted castor pomace per barrel of water. In Run No. 2 the water was saturated with sodium chloride. In Runs 3, 4, and 5 gypsum was added to the water as a contaminant. The drilling fluids of Runs 6, 7, and 8 each contained 6.25 weight percent of McCracken clay. The eight sample drilling fluids were each tested for pH and water loss control properties before and after aging. The results of said tests set forth in Table VI below show that said batch extracted castor pomace is also an effective water loss control agent.

vacuum oven at 70° C. until the water had been removed. The product obtained was ground to a finely divided powder.

The thus prepared alkali-treated castor pomace was used to prepare an additional series of four drilling fluids. Run 1 of said drilling fluids was a water base drilling fluid containing 6 pounds of said alkali-treated castor pomace per barrel of water, 12.5 weight percent of McCracken clay, and 0.30 pound per barrel of sodium hydroxide. Run 2 of said drilling fluids was an oil-in-water emulsion drilling fluid containing 6 pounds per barrel of said alkali-treated castor pomace, 12.5 weight percent of McCracken clay, 4.5 volume percent of diesel fuel, and 0.375 pound per barrel of added sodium hydroxide. Runs 3 and 4 of said drilling fluids were water base drilling fluids containing 6 and 12 pounds per barrel, respectively, of said alkali-treated castor pomace, each contain 6.25 weight percent McCracken clay, and neither contained

TABLE VI

| Example No. | Run No. | Drilling Fluid Composition | | | | | | Drilling Fluid Properties | | | |
|---|---|---|---|---|---|---|---|---|---|---|---|
| | | Clay, wt. percent | NaOH, lbs./bbl. | NaCl, lbs./bbl. | Gypsum, lbs./bbl. | Additive | | Initial | | After Aging Overnight at 80° C. | |
| | | | | | | Type | Lbs./bbl. | pH | Water Loss, cc./30 min. | pH | Water Loss, cc./30 min. |
| XIII | 1 | 0 | 1.0 | 0 | 0 | Ext.[1] | 12 | 11.7 | 17.0 | 10.7 | 13.2 |
| XIII | 2 | 0 | 1.0 | Sat.[2] | 0 | Ext. | 12 | 11.6 | 12.8 | 10.9 | 11.0 |
| XIII | 3 | 0 | 1.0 | 0 | 1 | Ext. | 12 | 11.9 | 12.8 | 10.0 | 14.6 |
| XIII | 4 | 0 | 1.0 | 0 | 1 | Ext. | 12 | 11.9 | 12.8 | 10.1 | 14.8 |
| XIII | 5 | 0 | 2.0 | 0 | 3 | Ext. | 12 | 12.1 | 12.2 | 11.8 | 21.6 |
| XIII | 6 | 6.25 | 0.5 | 0 | 0 | Ext. | 12 | 11.0 | 11.0 | 9.5 | 11.4 |
| XIII | 7 | 6.25 | 2.0 | 0 | 0 | Ext. | 12 | 12.3 | 8.2 | 11.9 | 18.2 |
| XIII | 8 | 6.25 | 4.0 | 0 | 0 | Ext. | 12 | 12.6 | 10.8 | 12.4 | 21.4 |

[1] Extracted castor pomace.  [2] Water in drilling fluid saturated with respect to NaCl.

EXAMPLE XIV

The alkali-treated castor pomace prepared as described above in Example IV was used to prepare another series of six drilling fluids to test the effectiveness of said alkali-added sodium hydroxide. The results of tests on said drilling fluids, before and after aging, set forth in Table VII below show that his alkali-treated castor pomace is also an effective water loss control agent.

EXAMPLE XVI

An extracted castor pomace prepared by the batch extraction method of Example III above was used to prepare another alkali-treated castor pomace. A 200-gram portion of said extracted castor pomace was mixed with 20 grams of sodium hydroxide in 1 liter of water. The resulting mixture was stirred for approximately 6 hours at 170° F. and then dried in a vacuum oven at 158° F. until the water had been removed. The resulting dried product was then powdered.

The thus prepared alkali-treated castor pomace was used to prepare an additional series of two drilling fluids. Run 1 of said drilling fluids was a water base drilling fluid containing 12 pounds of said alkali-treated caston pomace per barrel of water. Run 2 of said drilling fluids was a water base drilling fluid containing 12 pounds of said alkali-treated castor pomace per barrel of water to which one pound per barrel of gypsum had been added as a contaminant. Neither of said drilling fluids contained any added sodium hydroxide. The results of tests on said drilling fluids, before and after aging, set forth in Table VII below show that this alkali-treated castor pomace is also an effective water loss control agent.

TABLE VII

| Example No. | Run No. | Drilling Fluid Composition |||||||| Drilling Fluid Properties ||||
|---|---|---|---|---|---|---|---|---|---|---|---|---|
| | | Clay,[1] wt. percent | NaOH, lbs./bbl. | NaCl, lbs./bbl. | Gypsum, lbs./bbl. | Diesel Fuel, vol. percent | Additive || Initial || After Aging Overnight at 80° C. ||
| | | | | | | | Type | Lbs./bbl. | pH | Water Loss, cc./30 min. | pH | Water Loss cc./30 min. |
| XIV | 1 | 0 | | 0 | 0 | 0 | A.T.[2] | 12 | 11.0 | 21.2 | | |
| XIV | 2 | 12.5 | | 0 | 0 | 0 | A.T. | 12 | 10.3 | 8.0 | | |
| XIV | 3 | 0 | | 0 | 0 | 4.1 | A.T. | 12 | 11.2 | 23.0 | | |
| XIV | 4 | 12.5 | 1.0 | 0 | 0 | 4.1 | A.T. | 12 | 11.3 | 7.0 | | |
| XIV | 5 | 12.5 | 0.5 | 0 | 1 | 0 | A.T. | 12 | 10.6 | 12.2 | | |
| XIV | 6 | 12.5 | 0.125 | 10 | 0 | 0 | A.T. | 12 | 10.1 | 23.0 | | |
| XV | 1 | 12.5 | 0.30 | 0 | 0 | 0 | A.T.[2] | 6 | 10.0 | 7.5 | 10.0 | 6.8 |
| XV | 2 | 12.5 | 0.375 | 0 | 0 | 4.1 | A.T. | 6 | 10.3 | 8.0 | 10.3 | 5.0 |
| XV | 3 | 6.25 | | 0 | 0 | 0 | A.T. | 6 | 9.2 | 12.0 | 8.8 | 14.0 |
| XV | 4 | 6.25 | | 0 | 0 | 0 | A.T. | 12 | 9.6 | 7.4 | 9.3 | 8.4 |
| XVI | 1 | 0 | | 0 | 0 | 0 | A.T. | 12 | 10.5 | 18.6 | 10.2 | 17.0 |
| XVI | 2 | 0 | | 0 | 1 | 0 | A.T. | 12 | 10.3 | 16.2 | 10.9 | 14.5 |

[1] McCracken clay. [2] Alkali-treated castor pomace.

While certain embodiments of the invention have been described for illustrative purposes, the invention obviously is not limited thereto. Various other modifications will be apparent to those skilled in the art in view of this disclosure. Such modifications are within the spirit and scope of the invention.

I claim:

1. An aqueous drilling fluid, comprising water, finely divided inorganic solids, and a small but effective amount within the range of from 0.5 to 24 pounds per barrel of an extracted castor pomace which has been solvent extracted with an inert organic solvent so as to contain not more than about 3 weight percent residual castor oil, said amount being sufficient to improve at least one of the (a) lubricating properties and (b) fluid loss properties of said drilling fluid.

2. A well drilling fluid according to claim 1 wherein said castor pomace is present in an amount within the range of from 1 to 12 pounds per barrel of said drilling fluid.

3. A drilling fluid according to claim 1 wherein said castor pomace has been further treated with an aqueous solution of an alkali metal hydroxide in an amount within the range of about 2 to about 16 pounds of said hydroxide per 100 pounds of said pomace, at a temperature within the range of about 150 to about 200° F., and for a period of time within the range of from about 1 to about 10 hours.

4. A water base well drilling fluid having enhanced lubricating properties comprising a mixture containing: sufficient water to maintain said mixture fluid; sufficient finely divided inorganic solids to form a filter cake on the wall of the well; and a small but effective amount within the range of from 0.5 to 24 pounds per barrel, sufficient to provide said enhanced lubricating properties, of an extracted castor pomace which has been solvent extracted with an inert organic solvent so as to contain not more than about 3 weight percent residual castor oil.

5. A well drilling fluid according to claim 4 wherein said castor pomace is present in an amount within the range of from 1 to 12 pounds per barrel of said drilling fluid.

6. An oil-in-water emulsion drilling fluid having enhanced lubricating properties comprising an oil-in-water emulsion containing finely divided inorganic solids, and a small but effective amount within the range of from 0.5 to 24 pounds per barrel, sufficient to provide said enhanced lubricating properties, of an extracted castor pomace which has been solvent extracted with an inert organic solvent so as to contain not more than about 3 weight percent residual castor oil.

7. A well drilling fluid according to claim 6 wherein said castor pomace is present in an amount within the range of from 1 to 12 pounds per barrel of said drilling fluid.

8. In a process for the drilling of a well with well drilling tools wherein a drilling fluid is circulated in said well in contact with walls thereof, the improvement comprising: circulating in said well as said drilling fluid an aqueous drilling fluid comprising water and a small but effective amount within the range of from 0.5 to 24 pounds per barrel, sufficient to improve at least one of the (a) lubricating properties and (b) water loss properties of said drilling fluid, of an extracted castor pomace which has been solvent extracted with an inert organic solvent so as to contain not more than about 3 weight percent residual castor oil.

9. A process according to claim 8 wherein said castor pomace is present in said drilling fluid in an amount within the range of from 1 to 12 pounds per barrel of said fluid.

10. A process of drilling a well with a rotary bit which comprises forming a bore hole with said bit while circulating through said bit and through said bore hole in contact with the walls thereof a water base drilling fluid having enhanced lubricating properties comprising a mixture of: sufficient water to maintain said mixture fluid; sufficient finely divided inorganic solids to form a filter cake on the wall of the well; and a small but effective amount within the range of from 0.5 to 24 pounds per barrel, sufficient to provide said enhanced lubricating properties, of an extracted castor pomace which has been solvent extracted with an inert organic solvent so as to contain not more than about 3 weight percent residual castor oil.

11. A process according to claim 10 wherein said castor pomace is present in said well drilling fluid in an amount within the range of from 1 to 12 pounds per barrel of said fluid.

12. A process of drilling a well with a rotary bit which comprises forming a bore hole with said bit while circulating through said bit and through said bore hole in contact with the walls thereof an oil-in-water emulsion drilling mud having enhanced lubricating properties comprising: sufficient oil-in-water emulsion to maintain said drilling mud fluid; sufficient finely divided inert solids to form a filter cake on the wall of the well; and a small but effective amount within the range of from 0.5 to 24 pounds per barrel, sufficient to provide said enhanced lubricating properties, of an extracted castor pomace which has been solvent extracted with an inert organic solvent so as to contain not more than about 3 weight percent residual castor oil.

13. A process according to claim 12 wherein said castor pomace is present in said well drilling fluid in an amount within the range of from 1 to 12 pounds per barrel of said fluid.

14. In a process for the drilling of a well with well drilling tools wherein a drilling fluid is circulated in said well in contact with the walls thereof, and wherein said drilling fluid becomes contaminated with a contaminant selected from the group consisting of salt, gypsum, and mixtures thereof, present in a contaminating amount sufficient to increase the fluid loss from said drilling fluid to a formation penetrated by said well, the improvement comprising: circulating in said well an improved aqueous drilling fluid, resistant to the effect of said contaminants, comprising water, finely divided inorganic solids, and a small but effective amount within the range of from 0.5 to 24 pounds per barrel, sufficient to improve the fluid loss properties of said drilling fluid, of an extracted castor pomace which has been solvent extracted with an inert organic solvent so as to contain not more than about 3 weight percent residual castor oil.

References Cited

UNITED STATES PATENTS

| | | | |
|---|---|---|---|
| 2,935,504 | 5/1960 | King et al. | 252—8.5 |
| 2,017,090 | 10/1935 | Eggert | 71—23 |
| 2,209,591 | 7/1940 | Barnes | 252—8.5 |
| 2,333,061 | 10/1943 | Van Over | 71—23 |
| 2,502,484 | 4/1950 | Saunders | 71—23 |
| 2,547,980 | 4/1951 | Saunders | 71—23 |
| 2,555,794 | 6/1951 | Henkes | 252—8.5 |
| 2,607,767 | 8/1952 | Vassel | 260—123.5 |
| 3,047,493 | 7/1962 | Rosenberg | 252—8.5 |
| 3,101,266 | 8/1963 | Spies et al. | 71—23 |

OTHER REFERENCES

Van Dyke: "Oil Emulsion Drilling Mud, article in World Oil, November 1950, pp. 101 to 104 and 106.

LEON D. ROSDOL, *Primary Examiner.*

H. B. GUYNN, *Assistant Examiner.*